(No Model.) 4 Sheets—Sheet 1.
C. A. HEGE.
MACHINE FOR HULLING COFFEE OR FOR OTHER PURPOSES.
No. 512,881. Patented Jan. 16, 1894.
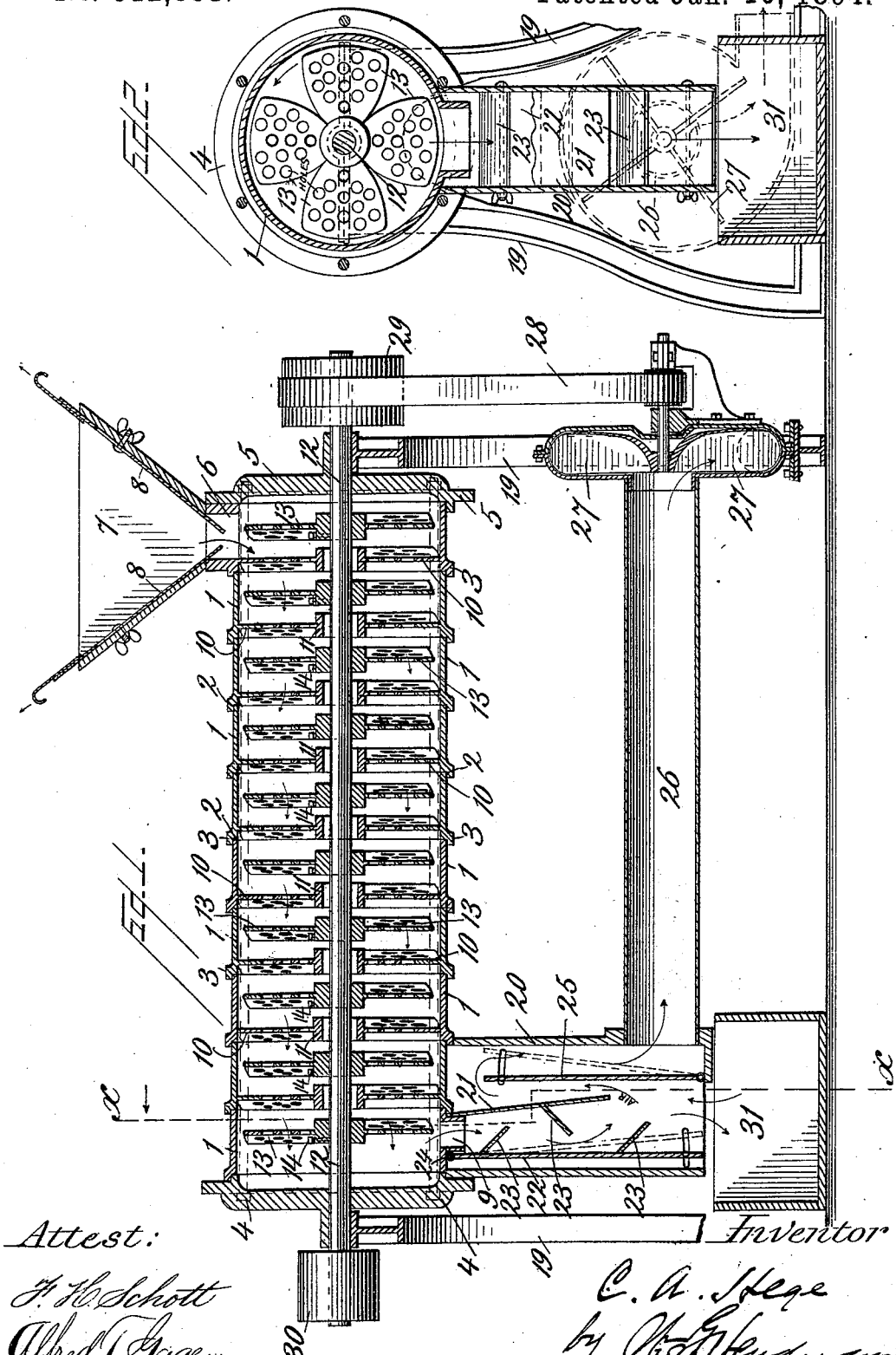
Attest:
F. H. Schott
Alfred T. Gage.
Inventor
C. A. Hege
by R. S. Henderson
Attorney

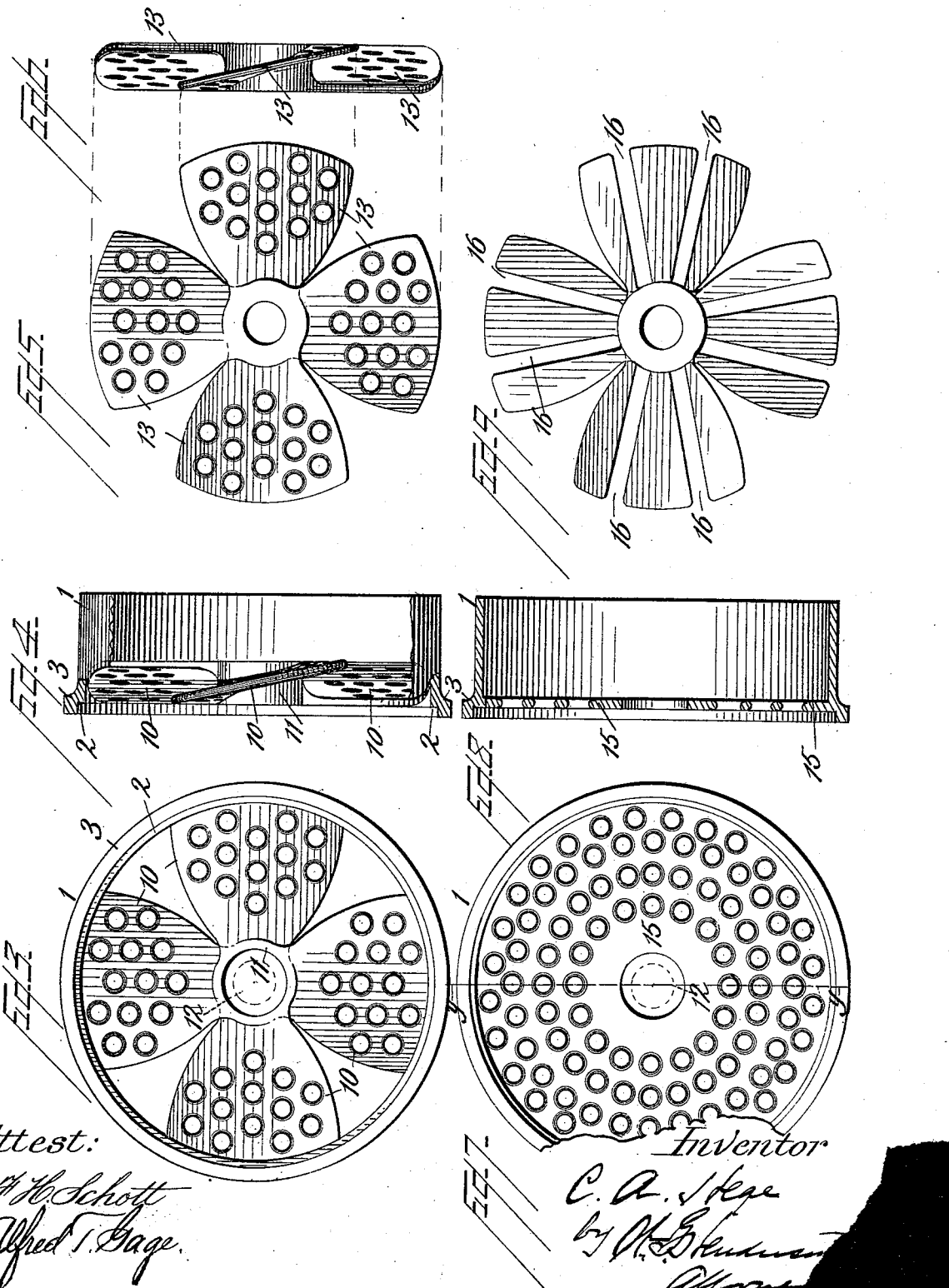

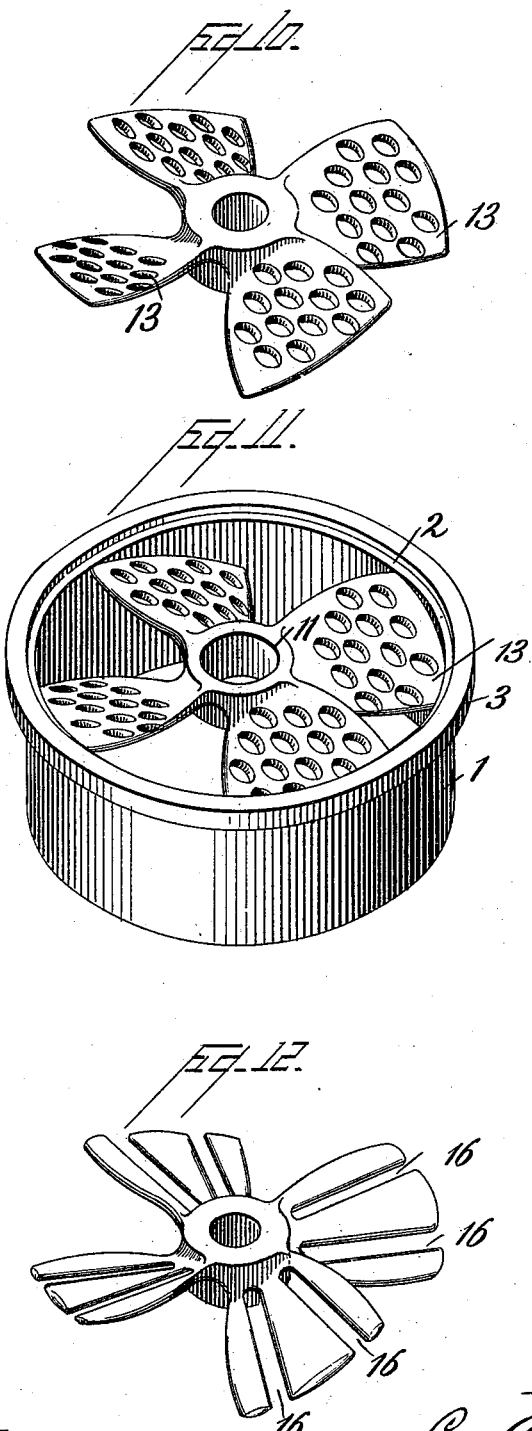

(No Model.) 4 Sheets—Sheet 4.
C. A. HEGE.
MACHINE FOR HULLING COFFEE OR FOR OTHER PURPOSES.
No. 512,881. Patented Jan. 16, 1894.
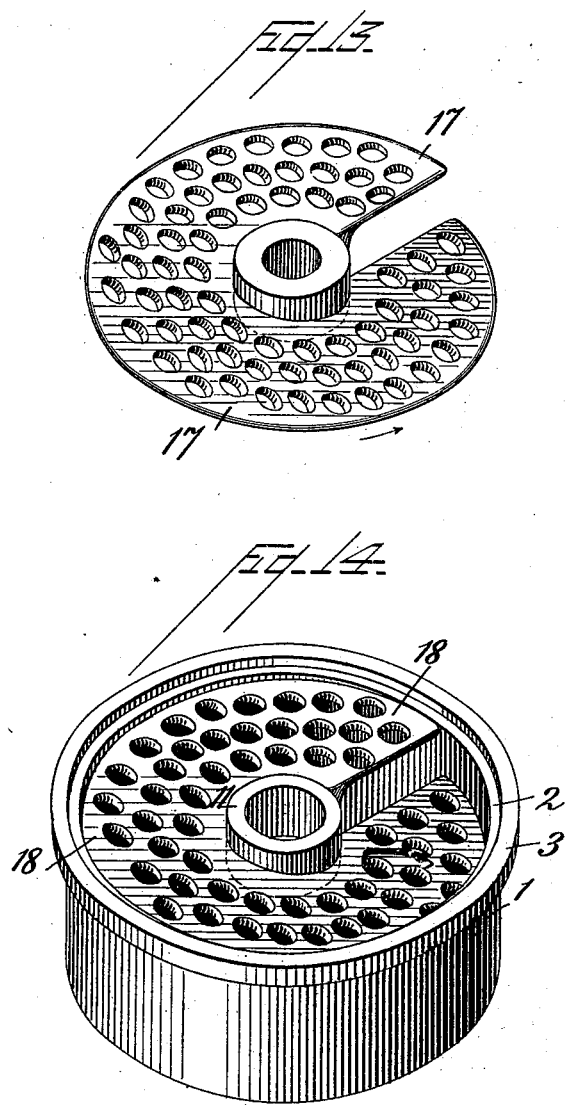

UNITED STATES PATENT OFFICE.

CONSTANTINE ALEXANDER HEGE, OF SALEM, NORTH CAROLINA.

MACHINE FOR HULLING COFFEE OR FOR OTHER PURPOSES.

SPECIFICATION forming part of Letters Patent No. 512,881, dated January 16, 1894.

Application filed April 28, 1892. Serial No. 430,983. (No model.)

*To all whom it may concern:*

Be it known that I, CONSTANTINE ALEXANDER HEGE, a citizen of the United States, residing at Salem, in the county of Forsyth and State of North Carolina, have invented certain new and useful Improvements in Machines for Hulling Coffee or for other Purposes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates more particularly to machines for hulling coffee although it may be adapted for decorticating rice and other cereals or grain, as well as for other purposes; and it has for its object to provide a machine which will most thoroughly hull or decorticate the berry or cereal in the minimum of time, and to combine in said machine simplicity of construction with an arrangement of parts which will give the greatest efficiency in the operation without injury to the berry or cereal.

To the accomplishment of the foregoing and such other objects as may hereinafter appear the invention consists in the construction and in the combination of parts hereinafter particularly described and afterward sought to be specifically defined by the claims, reference being had to the accompanying drawings forming a part hereof and in which—

Figure 1 represents a vertical longitudinal section to the machine; Fig. 2 a transverse vertical section on line *x—x* of Fig. 1; Fig. 3 a plan view of one section of the cylinder showing the stationary blades therein when constructed similarly to propeller blades; Fig. 4 an end view of Fig. 3 with a portion of the cylinder or ring broken away and another portion in section and showing the blades in full line; Fig. 5 a plan view of one of the revolving propeller blades; Fig. 6 an end view of Fig. 5; Fig. 7 a plan view of one section of the cylinder showing the beater or stationary blade made continuous and flat with perforations through it as a modification of the form shown in Fig. 3; Fig. 8 a transverse section through Fig. 7; Fig. 9 a plan of a modified form of the revolving propeller blade in which the blades are divided by slots or spaces running lengthwise of the blades instead of having perforations as in Fig. 5; Fig. 10 a perspective of the form indicated in Fig. 5; Fig. 11 a perspective of one section of the cylinder with its stationary propeller blades or beaters; Fig. 12 a perspective of the form of revolving propeller blades or beater illustrated in Fig. 9; Fig. 13, a perspective of another modified form of rotating propeller blades or beaters in which the same is made with a spiral inclined surface with its ends separated; and Fig. 14 a perspective of one section of the cylinder and stationary blade or beater formed on a spiral incline corresponding to the form shown in Fig. 13.

In constructing the machine I make use of a cylinder containing a series of stationary blades or beaters and a series of revolving or rotatable blades or beaters. This cylinder I prefer to construct or build up of a series of rings designated by the numeral 1 and which are fitted end to end until the desired length of cylinder is obtained. I prefer to form one end of each ring with a recess 2 to receive the opposite end of a correspondingly formed ring as illustrated in Fig. 1 and at such point to form an enlargement 3 around the ring for the purpose of effecting a close union or joint between the rings and giving strength at such joints. After the desired number of rings have been put into position, end caps 4 and 5 are applied to the opposite ends of the cylinder thus formed and they and the series of rings held firmly together by bolts or tie rods extended lengthwise of the cylinder and provided at their ends with nuts to tighten up and clamp the parts together, the tie rods and nuts being illustrated by dotted lines in Fig. 1, and the rods by full sectional lines in Fig. 2. The end ring at the receiving end of the cylinder is formed with an opening 6 for the entrance of the material into the cylinder, over which opening is seated a hopper 7 provided with adjustable valves or dampers 8 for regulating the flow of the material into the cylinder. The end ring at the discharge end of the cylinder is formed with an opening 9 for the exit of the material.

Within the cylinder at suitable intervals apart I place a series of stationary blades or beaters 10 which are preferably formed integral with the ring 1 and made with hubs 11 through which a revolving shaft 12 will pass, there being left a sufficient space between the interior of the hub and the shaft to permit the berries to pass through the same without becoming crushed in their passage from end to end of the cylinder. While it is preferred to construct the hub as described it may be made to fit close to the shaft as the hubs to the revolving blades or beaters are illustrated but so as to permit the shaft to turn. It is preferred to form these stationary blades or beaters 10 in the form of propeller blades as clearly illustrated in Figs. 3, 4, and 11 of the drawings whereby they are caused to present an inclined surface to the berries or cereal as the same is carried from end to end of the cylinder, there being openings or spaces between the blades for the passage of the berry, and the blades being formed with perforations or openings for the passage of the berries and an air current or blast. I also place within the cylinder a series of revolving or rotatable blades or beaters designated by the numeral 13 which preferably are formed like propeller blades similarly to the stationary blades or beaters. These rotatable blades or beaters are placed between the stationary beaters, usually, in practice, so as to leave a space of three-eighths of an inch between them and the stationary blades, and are secured to the revolving shaft 12 by set screws 14 passed through their hubs and against the shaft. By forming both the stationary and the revolving beaters, each, of a series of blades inclined like propeller blades the berries or material received at the hopper end of the cylinder is fed toward the tail end of the cylinder and on its way is thrown with force by the revolving propeller blades or beaters against the inclined faces of the next adjoining stationary beaters so as to break up and loosen the hulls or covering to the berry or cereal and at the same time subject the same to a rubbing action between the two inclined surfaces whereby the hull or covering is removed from the berry or cereal. By reason of the inclined surfaces of the blade the material is thrown by a diagonal blow from the revolving beaters so that the material is impelled in a diagonal line against the surface of the stationary beaters whereby a rubbing action is obtained which is not obtained under constructions heretofore in use. When both the stationary and the revolving beaters are formed with inclined surfaces the material besides being thrown in the manner previously indicated is carried or moved between the surfaces which gradually approach nearer to each other in the course of rotation of the beaters so that a better rubbing action is obtained than otherwise while the material is at the same time thrown with greater force against the stationary beaters and also fed forward through the cylinder. This propeller like construction of the beaters also causes a strong movement or blast of air through the cylinder so that as the hull or covering to the berry or cereal is fractured and loosened this air blast or strong current of air will separate the loosened particles from the berry and at the same time open up the body of the material whereby it may be more effectually acted upon by the beaters. The blades or beaters are formed with a series of openings either in the manner of perforations or otherwise for the passage of the air and the berry or cereals and the separated particles so that the material between the beaters is more thoroughly agitated and the fractured particles separated from the berry or cereal. The material also passes forward through the spaces or openings existing between the several blades of each beater as will be apparent from an inspection of the drawings.

If desired the stationary beater instead of being made like propeller blades as illustrated in Figs. 3, 4 and 11 may be made of a flat plate or partition 15 formed with openings, which may be in the form of perforations, as illustrated in Figs. 7 and 8, for the passage of the berry or cereal and air current; but the form first described is preferred. And instead of making the revolving beaters with perforations through their blades as illustrated in Figs. 5, 6 and 10, said blades may be divided by slots or openings 16 running lengthwise of the blade as illustrated in Figs. 9 and 12, the blades being otherwise formed and arranged as shown in Figs. 5, 6 and 10. In other words the blades are the same as shown in those figures except instead of having perforations they have elongated openings as illustrated in Figs. 9 and 12.

The propeller like blades may be said to constitute a spirally winding surface with breaks in its continuity as illustrated in Figs. 4, 6, 10, 11 and 12; but I may modify that construction by forming both the stationary and the revolving beaters of a continuous surface inclining spirally as indicated in Figs. 13 and 14 of the drawings, Fig. 13 representing a rotating beater 17 inclined spirally with a space between its two ends but the surface otherwise continuous in its incline and formed with perforations, and Fig. 14 representing a stationary beater 18 formed integrally with the ring 1 and having a continuously inclined surface similar to that of the rotating beater and likewise perforated. In this modification illustrated by Figs. 13 and 14 the rotating beater is represented as of a form designed to be revolved to the right, while the forms illustrated in the other figures are designed to be revolved to the left in the operation of the machine although it is obvious that the parts may be constructed to revolve either to the right or to the left as desired the change being only such as involves the work of the mechanic.

The beater cylinder constructed as described will be supported upon suitable standards 19 in the upper ends of which the shaft 12 may have its bearing; and beneath the opening in the discharge end of the cylinder there will be placed a separator preferably composed of a box or casing 20 having within it partitions 21 and 22 forming a chute for the material passing through the exit opening 9 in the cylinder, which chute is provided with oppositely inclined shelves or deflectors as illustrated in Fig. 1 so as to cause the material to take a zig-zag or tortuous passage through the chute. The partition 22 is hinged at one end, say at its upper end as indicated at 24, so that it may be moved laterally to increase or lessen the inner diameter of the chute as indicated by dotted lines in Fig. 1 whereby the travel of the material down that chute may be regulated, there being employed any suitable means for holding the partition 22 to its adjustment. There is also movably fixed within the box or casing 20 another partition 25 which is hinged at its lower end and adapted to be swung back and forth so as to regulate the force of a suction blast upon the material passing through the box or casing. One position of said partition is illustrated in full lines in Fig. 1 and another partition in dotted lines. The partition will be held at any desired adjustment by any suitable means. A pipe or flue 26 connects at one end with the lower part of the box or casing 20 and at its other end with a suction fan 27 which is operated by a belt 28 connected to a pulley 29 on one end of the shaft 12 so that as the shaft is turned by suitable connection made to the pulley 30 on the opposite end of the shaft the fan will be operated through its belt connection with said shaft. This fan creates an air suction through the box or casing 20 so that the material, for instance, the coffee berries, or cereals, passing down through that box will be acted on by the blast to carry off the hulls and other loose particles from the berry while the latter will drop into the box or other receptacle 31 provided therefor underneath the box or casing.

With a machine constructed as illustrated in Fig. 1 the coffee berries are subjected to a most thorough beating and rubbing operation which thoroughly and completely removes the hulls or covering from the berry and delivers the berry entirely freed therefrom and without injury whatever to itself. Such decortication is also effected in the minimum of time. The machine is also simple in construction as well as efficient in action; and while it is particularly adapted for hulling coffee still it is not confined to such use where the same action is desired and it can be used with good results on other material or substances.

I have described with particularity what I consider to be the best construction and arrangement of the several parts in their details but still it is to be understood that I am not confined to such details where the same general features of construction and combination are used under different details of construction in the several parts. It will be understood, too, that any two of the several forms illustrated can be used together where they will have the same action in principle but differing in degree.

I have described the operation of the machine for hulling coffee and decorticating other grains and cereals but the machine is not confined to such uses but as already stated may be used for other purposes. For instance, by increasing the speed of rotation of the beaters the machine may be used as a pulverizer for different materials as the impact of the material against the blades when the beaters are given speed sufficient for the particular material under treatment will thoroughly pulverize the material, the degree of pulverization varying with the speed of rotation of the beaters.

Having described my invention and set forth its merits, what I claim is—

1. The combination with the cylinder provided with a series of beaters formed with a series of apertures to permit the passage of material, and currents of air of a second series of beaters formed with a series of apertures to permit the passage of material and air and arranged to rotate between said first series and inclined around their axes with the rise of the inclination in the direction of rotation, substantially as and for the purposes described.

2. The combination with the cylinder provided with a series of stationary beaters each formed independent of the other and on a spiral to impart an inclined surface, and constructed to permit the passage of material, of a second series of independent beaters arranged to rotate between said first series and formed on an incline with the rise in the direction of the rotation and constructed to permit the passage of material, substantially as and for the purposes described.

3. The combination with the cylinder provided with a series of beaters formed to permit the passage of material from one side to the other of the beaters, of a second series of beaters arranged to rotate between the first series, the beaters of one of said series being each formed of a number of blades arranged on an incline, substantially as and for the purposes described.

4. The combination with the cylinder provided with a series of beaters formed for the passage of material from one side to the other, of a second series of beaters arranged to rotate between the first series and each formed of a number of apertured blades arranged on an incline, substantially as and for the purposes described.

5. The combination with the cylinder provided with a series of beaters each one of the series being formed of a number of blades arranged on an incline, of a second series of beaters arranged to rotate between the beaters of the first series and each formed of a number of blades arranged on an incline, substantially as and for the purposes described.

6. The combination with the cylinder provided with a series of beaters formed for the passage of material from one side of the beater to the other, of a second series of beaters arranged to rotate between the first series, the beaters of one series being each formed of a number of blades arranged on an incline rising in the same direction as described and having elongated openings therein, substantially as and for the purposes described.

7. A cylinder formed of a series of rings each having connected to it a beater formed at its central portion with an opening sufficiently larger than a shaft passing through it as to permit the passage of material between the shaft and beater and also formed at a point distant from said central opening with an opening for the passage of material from one side to the other, of the beater, in combination with a series of beaters between the first series, one series of beaters being arranged on an incline, and means for rotating one series, substantially as and for the purposes described.

8. The combination with the cylinder, of a series of beaters constructed for the passage of material from one side to the other of the beaters and having a central opening sufficiently larger than a shaft passing through it as to permit the passage of material between the shaft and beater, and a second series of beaters arranged between the beaters of the first series, one series of beaters being rotatable and arranged on an incline, substantially as and for the purposes described.

9. The combination with the cylinder provided with the beaters and discharge opening, of the separator below the discharge from the cylinder, the chute formed by the vertical partitions provided with deflectors to retard the flow of the material, one of said partitions being hinged to allow it to swing to regulate the distance between the two partitions to control the flow of the material, and a side wise adjustable vertical partition located to one side of the partitions having the deflectors for regulating the force of an air current, and a fan for creating an air current, substantially as and for the purposes described.

In testimony whereof I affix my signature in presence of two witnesses.

CONSTANTINE ALEXANDER HEGE.

Witnesses:
T. H. KEARNS,
EUGENE E. GRAY.